United States Patent [19]
Tada et al.

[11] Patent Number: 4,754,950
[45] Date of Patent: Jul. 5, 1988

[54] VALVE

[75] Inventors: Kaoru Tada, Isehara; Mituo Kawai; Tetsuo Fujiwara, both of Yokohama; Noriyuki Chujyo, Yokosuka; Masahiko Hasunuma, Tokyo; Yuji Yasuda, Yokosuka, all of Japan

[73] Assignee: Kabushiki Kaisha Toshiba, Kawasaki, Japan

[21] Appl. No.: 792,593

[22] Filed: Oct. 29, 1985

[30] Foreign Application Priority Data

Oct. 30, 1984 [JP] Japan ................................. 57-226817
Jun. 26, 1985 [JP] Japan ................................. 60-137932

[51] Int. Cl.$^4$ ............................................. B32B 15/18
[52] U.S. Cl. ..................................... 251/368; 420/57; 420/59; 428/679
[58] Field of Search .................. 251/368, 327; 420/59, 420/57; 428/679; 123/188 S

[56] References Cited

U.S. PATENT DOCUMENTS

| | | | |
|---|---|---|---|
| 1,979,910 | 11/1934 | Scott | 251/368 |
| 2,091,745 | 8/1937 | Webb | 251/368 |
| 2,246,078 | 6/1941 | Rohn et al. | 251/368 |
| 2,396,552 | 3/1946 | Cape | 251/368 |
| 2,698,785 | 1/1955 | Jennings | 75/126 |
| 3,278,298 | 10/1966 | Perry | 75/128 |
| 4,394,169 | 7/1983 | Kaneko et al. | 75/128 A |
| 4,430,297 | 2/1984 | Crook | 420/442 |
| 4,546,737 | 10/1985 | Kazuoka et al. | 251/368 |

FOREIGN PATENT DOCUMENTS

| | | |
|---|---|---|
| 1458323 | 9/1971 | Fed. Rep. of Germany . |
| 1458330 | 2/1977 | Fed. Rep. of Germany . |
| 3000913 | 7/1980 | Fed. Rep. of Germany . |
| 0187663 | 11/1983 | Japan ................................. 251/368 |
| 1197149 | 3/1984 | Japan . |
| 1013239 | 12/1965 | United Kingdom . |
| 2039950 | 8/1980 | United Kingdom . |

OTHER PUBLICATIONS

Metal Progress, May 1981, pp. 35-37 "PH 13-8 MO-Alternative to Cobalt Containing Casting Alloys, E. L. AuBuchon et al.

Primary Examiner—A. Michael Chambers
Attorney, Agent, or Firm—Foley & Lardner, Schwartz, Jeffery, Schwaab, Mack, Blumenthal & Evans

[57] ABSTRACT

There is disclosed a valve comprising one valve seat ring, of a disc or a body, having a surface composed of a Cr-Mn-Fe system or a Cr-Ni-Fe system Fe-based precipitation hardening type alloy, and another valve seat ring thereof having a surface composed of a Cr-Ni system Ni-based alloy having a hardness Hv of 400 or more.

The valves of this invention can have excellent wear resistance, cavitation erosion resistance and galling resistance, and since emitting no cobalt, the valves of this invention are suitable for various plants such as chemical plants, particularly nuclear power plants.

13 Claims, 1 Drawing Sheet

VALVE

BACKGROUND OF THE INVENTION

This invention relates to a valve excellent in galling-resistant and cavitation erosion-resistant properties.

Heretofore, seat rings of valves used in various plants such as chemical plants and nuclear power plants are welded with a Co-based Cr-W-C-Co alloy which is generally called a Stellite in order to provide them with galling-resistant and cavitation erosion-resistant properties.

However, from the viewpoints of the prevention of exhaustion of cobalt resources and the improvement of safety in the nuclear power plants, researches have been conducted into valve seat rings on which an Ni-based or Fe-based cavitation erosion-resistant and wear-resistant alloy is employed instead of the above-mentioned Stellite, with the intention of inhibiting the emission of cobalt (see D. Ellis and R. L. Squires, "Weld Deposition and Properties of Nickel Based Hardfacing Alloys", Metal Construction, 15 (7) 388–393).

The known Ni-based and Fe-based alloys are, however, poorer in cavitation erosion-resistant and galling-resistant properties as compared with the Co-based Stellite.

SUMMARY OF THE INVENTION

This invention has now been completed to eliminate the above-mentioned problem, and its object is to provide a valve from which neither cobalt particles nor cobalt ions are released essentially in any plant and which has excellent cavitation erosion-resistant and galling-resistant properties.

The present inventors have researched into how the cavitation erosion-resistant and the galling-resistant properties equivalent to or superior to those of the Stellite can be given to the valve seat rings without using any cobalt. It is apparent that when the surfaces of the valve seat ring which will be brought into contact with and will slide on each other are made of similar and ductile materials, a wear loss will be large and a galling phenomenon will tend to occur. Therefore, it can be presumed that the employment of the pair of valve seat rings made of specific different materials will lead to functional effects equivalent to the Stellite even without relying on the latter, and from this presumption, this invention has been created.

That is to say, this invention is directed to a valve which comprises one valve seat ring, of a disc or a body, having a surface composed of a Cr-Mn-Fe system or a Cr-Ni-Fe system Fe-based precipitation hardening type alloy, and another valve seat ring thereof having a surface composed of a Cr-Ni system Ni-based alloy having a hardness Hv of 400 or more such as a Cr-Mo-Nb-Ni system and a Cr-Si-B-Ni system Ni-based alloy.

DESCRIPTION OF THE PREFERRED EMBODIMENTS

Figure 1:
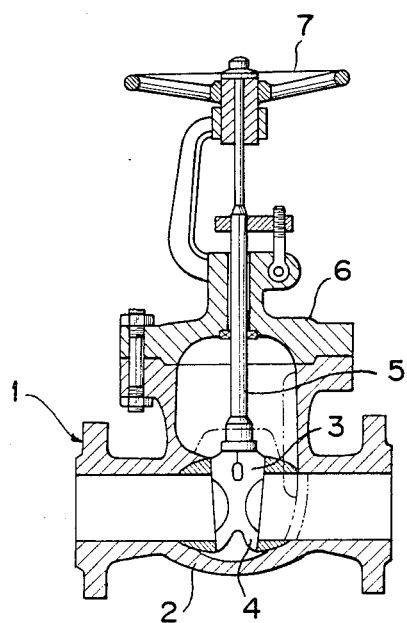
FIG. 1 is a vertical section illustrating an embodiment of this invention.

According to this invention, there can be provided a valve excellent in galling-resistant properties by the combination of a Cr-Mn-Fe system or a Cr-Ni-Fe system Fe-based precipitation hardening type alloy having good corrosion resistance and hardness, and the above-mentioned Ni-based alloy having good corrosion resistance and hardness.

Examples of the Cr-Mn-Fe system Fe-based precipitation hardening type alloys used in this invention include alloys comprising, for example, 10 to 30% by weight of chromium, 10 to 30% by weight of manganese, 0.5 to 3.0% by weight vanadium, 0 to 0.3% by weight of carbon, 0.2 to 1.0% by weight of nitrogen and a residue of iron.

The contents of the aforesaid components are limited for the following reasons:

Cr (chromium) is an essential element for improving corrosion resistance and strength, and its necessary content is at least 10% by weight. However, its upper limit is put on a level of 30% by weight, since when the content of Cr is too high, toughness will deteriorate. More preferably, 12 to 25% by weight.

A content of Mn (manganese) is required to be 10% by weight or more to heighten strength, work-hardening properties and resistance to cavitation erosion, but since its excessive addition impairs workability, the content is limited to 30% by weight and is preferably within the range of 15 to 25% by weight.

With regard to V (vanadium), its content of at least 0.5% by weight is necessary to obtain precipitates and to improve strength and resistance to cavitation erosion. Its suitable content is 1.0% by weight or more, but the upper limit is regulated to 3.0% by weight, since the addition of much vanadium will bring about the deterioration of workability.

C (carbon) is an element effective to obtain precipitates in cooperation with V and to enhance strength and resistance to cavitation erosion, but the addition of much carbon will impair corrosion resistance remarkably. Therefore, the content of C preferably is 0.2% by weight or less, though the upper limit of 0.3 % by weight has been given hereinbefore.

N (nitrogen) is an element necessary to obtain precipitates in cooperation with V and to enhance strength and resistance to cavitation erosion, and its required content is at least 0.2% by weight. The content of 0.3% by weight or more is suitable, but when it is too much, pin-holes and blow-holes will occur and melting will become difficult. Thus, the upper limit is regulated to 1.0% by weight. Preferably, the content of N is within the range of 0.3 to 0.6% by weight.

Examples of the Cr-Ni-Fe system Fe-based precipitation hardening type alloys used in this invention include SUS 630, SUS 631 and maraging steels.

Above all, the Fe-based precipitation hardening type alloy having a composition of 7 to 14% by weight of Cr, 6 to 10% by weight of Ni, 0.5 to 2.0% by weight of Al, 1.5 to 3% by weight of Mo, 0.1% by weight or less of C and a residue of Fe is particularly suitable for this invention, because of excellent hardness and corrosion resistance.

With regard to Cr, its content is required to be 7% by weight or more for the improvement of corrosion resistance. However, much chromium will accelerate the formation of a ferrite and will deteriorate hardness. Therefore, the content of Cr is 14% by weight or less and ranges preferably from 11.5 to 13.5% by weight.

In order to perform the functions of bringing about a precipitation hardening phenomenon and impeding the formaiton of a ferrite, Ni should be added in an amount of 6 % by weight or more. However, when its content is too high, the formation of an austenite will be accelerated and strength will be poor. For these reasons, its upper limit is regulated to 10% by weight, and thus the content of Ni preferably ranges from 7.0 to 9.0% by weight.

As for the element Al, its addition of 0.5% by weight or more is necessary in order to allow precipitation hardening and too much aluminum will impair workability, and thus the content of Al is regulated to 2% by weight or less and ranges preferably from 0.7 to 1.5% by weight.

A content of Mo is required to be 1.5% by weight or more so as to improve corrosion resistance and strength. However, since much Mo will accelerate the formation of a ferrite, the content of Mo is 3% by weight or less and ranges preferably from 1.7 to 2.5% by weight.

Carbon is a component for improving strength and inhibiting the formation of a ferrite, but when its content is too high, this element will hurt corrosion resistance and ductility. Therefore, the content of carbon is regulated to 0.1% by weight or less, preferably 0.05% by weight or less.

With regard to the Cr-Mo-Nb-Ni system alloy used for another valve seat ring of this invention, there may be mentioned, for example, an alloy consisting essentially of 15 to 45% by weight of chromium, 3 to 15% by weight niobium, 0 to 20% by weight of molybdenum, 0 to 20% by weight of iron and a residue of nickel. In the following, the reasons why contents of these components are limited to the aforesaid ranges are explained.

First, chromium is a component effective to improve corrosion resistance and necessary to heighten oxidation resistance at high temperatures and hardness, but when its composition ratio is less than 15% by weight, functional effects will be insufficient; when it is more than 45% by weight, coarse primary phase will deposit excessively and desired properties will deteriorate. Therefore, the content of chromium is preferably within the range of 20 to 35% by weight.

Niobium can be combined with chromium and nickel to produce an intermetallic compound such as $Cr_2Nb$, and to thereby heighten strength, and it is a component necessary for wear resistance and cavitation erosion resistance. When a composition ratio of niobium is less than 3% by weight, the effects will be insufficient; when it is more than 15% by weight, toughness will become poor and mechanical strength will also be impaired. In consequence, the content of niobium is preferably within the range of 7 to 15% by weight.

Molybdenum is a component necessary for the improvement of corrosion resistance and for the improvement of hardness, wear resistance and cavitation erosion resistance by strengthening a solid solution. When its composition ratio is in excess of 20% by weight, effects will reach a maximum level and toughness will fail. This is the reason why the limitation of molybdenum has been made as given above. Moreover, the composition range of molybdenum is preferably within the range of 5 to 15% by weight.

In this Ni-based alloy, a part of niobium may be replaced with tantalum. Further, a part of molybdenum may be replaced with tungsten. The Ni-based alloy may contain manganese and silicon which will be added at the melting step as a deoxidizer and a desulfurizer.

The further addition of 20 % by weight or less of iron to the above-mentioned alloy contributes to the improvement of strength and toughness of the alloy material. A small amount of iron can give some effect to the alloy material, but its content preferably is 3% by weight or more. When the content of iron is more than 20% by weight, the strength of the alloy material will fall and the mechanical strength of the alloy will be impaired. Accordingly, it is preferably within the range of 3 to 12% by weight.

As the Cr-Si-B-Ni system alloy to be used in this invention, there may be mentioned, for example, an alloy comprising 0.3 to 1.5% by weight of carbon, 5 to 25 % by weight of chromium, 0.5 to 6.0% by weight of boron, 0.5 to 6.0 % by weight of silicon, 10% by weight or less of iron and a residue which is substantially nickel.

Carbon is an element effective to heighten wear resistance and hardness, and when its content is less than 0.3% by weight, wear resistance and hardness will be poor; when it is more than 1.5% by weight, toughness will drop. Therefore, the content of carbon is within the range of 0.3 to 1.5 % by weight, preferably the range of 0.4 to 1.0 % by weight.

Silicon and boron are elements effective to enhance wear resistance and strength due to the formation of a silicide and a boride, and when a content of each element is less than 0.5% by weight, effects will be insufficient; when they are present in large quantities, the coarse silicide and boride will be produced and toughness will fall. Therefore, the content of each element is regulated to 6% by weight or less, and it is preferred that the content of boron is within the range of 0.5 to 5.0% by weight and the content of silicon is within the range of 2.5 to 6.0% by weight.

Iron contributes to the reinforcement of the matrix and the improvement of thermal shock resistance, and when its content is in excess of 10% by weight, the strength of the matrix will drop and mechanical strength will be impaired. The preferable content of iron is within the range of 1 to 6% by weight.

Further, chromium is a component necessary to improve corrosion resistance and to reinforce the matrix, and when its content is less than 5% by weight, effects will not be satisfactory; when it is more than 25% by weight, toughness will fall. Therefore, the content of chromium is regulated to the range of 5 to 25% by weight, preferably the range of 10 to 20% by weight.

The Ni-based alloy used in this invention has a hardness Hv of 400 or more, preferably 450 or more, and the combination of this Ni-based alloy with the above-mentioned Fe-based precipitation hardening type alloy can lead to good resistance to galling.

The Cr-Mn-Fe system or the Cr-Ni-Fe system Fe-based precipitation hardening type alloy and the Cr-Mo-Nb-Ni system or the Cr-Si-B-Ni system Ni-based alloy which have been just described may be used in manners of, for example, pad welding on the surfaces of a valve seat ring, brazing, diffusion bonding, joining by screw or the like. In short, it is necessary that the sliding surfaces of valve seat rings are constituted with the above-mentioned alloys.

Now, this invention will be described in detail with reference to Examples.

EXAMPLES

Table 1 shows chemical compositions of alloys for the test. Sample Nos. 1 to 5 and 11 were vacuum induction melted and subjected to a hot forging treatment and then a solid solution treatment at 950° to 1150° C. for about 1 to 2 hours and an aging treatment at 500° to 700° C. for about 1 to 10 hours were performed and specimens were taken from the thus treated samples. Sample Nos 6 to 10 and 12 were taken from cast materials which were obtained using the high-frequency vacuum induction melting furnace.

A cavitation erosion test was carried out under conditions of an amplitude of 90 μm, a frequency of 6.5 KHz and a test time of 180 minutes in accordance with an ultrasonic vibration method prescribed by 19th Corrosion Prevention Forum, Cavitation Section, 98th Committee (1972) in order to measure a cavitation erosion loss of each sample. The results are set forth in Table 1.

TABLE 1

| Sample No. | Chemical composition (wt %) | | | | | | | | | | | Hardness (Hv) | Weight loss (mg) |
|---|---|---|---|---|---|---|---|---|---|---|---|---|---|
| | C | B | N | Si | Mn | Cr | Mo | Nb | Fe | Ni | Others | | |
| 1 | 0.11 | — | 0.61 | 0.13 | 24.6 | 18.3 | — | — | Remainder | — | V 1.39 | 401 | 0.4 |
| 2 | 0.12 | — | 0.49 | 0.14 | 20.2 | 16.8 | — | — | Remainder | — | V 1.21 | 392 | 0.7 |
| 3 | 0.05 | — | — | — | — | 17.2 | — | 0.30 | Remainder | 4.32 | Cu 4.21 | 422 | 5.1 |
| 4 | 0.06 | — | — | — | — | 17.0 | — | — | Remainder | 7.13 | Al 1.21 | 410 | 4.5 |
| 5 | 0.03 | — | — | — | — | 13.2 | 2.14 | — | Remainder | 8.07 | Al 1.26 | 495 | 4.2 |
| 6 | — | — | — | 0.21 | — | 24.6 | 9.6 | 9.4 | — | Remainder | — | 494 | 3.2 |
| 7 | — | — | — | 0.19 | — | 25.0 | 11.1 | 10.3 | 6.3 | Remainder | — | 476 | 3.0 |
| 8 | 0.37 | 2.42 | — | 2.71 | — | 10.7 | — | — | 3.51 | Remainder | — | 462 | 19.8 |
| 9 | 0.59 | 2.98 | — | 4.20 | — | 13.6 | — | — | 3.73 | Remainder | — | 620 | 9.5 |
| 10 | — | — | — | 0.18 | — | 15.6 | 8.6 | 2.4 | — | Remainder | — | 272 | 40.1 |
| 11 | 0.08 | — | 0.11 | 0.19 | 5.93 | 7.21 | — | — | Remainder | — | V 1.02 | 243 | 51.4 |
| 12 | 1.0 | — | — | — | — | 28.0 | — | — | 3.0 | Co Remainder | W 4.0 | 478 | 3.6 |

As is clear from Table 1, Sample Nos. 1 to 9 which were the Cr-Mn-Fe system and the Cr-Ni-Fe system iron-based precipitation hardening type alloys and the Ni-based alloys were equivalent, in a cavitation erosion loss, to the cobalt-based alloy of Sample No. 12 which had heretofore been used as wear-resistant parts such as the valve seats, and it was also confirmed that they were excellent in cavitation erosion resistances.

Next, sluice valves, one example of which was shown in FIG. 1 and each of which had a nominal diameter of 100 mm, were manufactured by combining the above alloys with each other as shown in Table 2, and a leakage of each sluice valve was tested after repeated opening and closing operations thereof. In the FIG. 1, reference numeral 1 is a body, 2 is a body seat ring, 3 is a disc, 4 is a disc seat ring, 5 is a stem, 6 is a bonnet and 7 is a handwheel. For comparison, sluice valves each having the same structure were manufactured by combining the alloys of Sample Nos. 5, 8 and 10 to 12 with each other as shown in Table 2, and the test was accomplished under the same conditions. The results are exhibited together in Table 2.

The aforesaid opening and closing operations were carried out 100 times under load conditions of a surface pressure of 2 Kg/mm$^2$, and the leak test was accomplished by causing high-pressure water to pass through the sluice valve and measuring a flow rate of leaked water on the outlet side thereof.

TABLE 2

| | Combination of valve seats | | Flow rate of leaked water (cc/min) |
|---|---|---|---|
| | Body seat ring | Disc seat ring | |
| Example 1 | Sample No. 6 | Sample No. 1 | 0 |
| Example 2 | Sample No. 2 | Sample No. 8 | 0 |
| Example 3 | Sample No. 7 | Sample No. 5 | 0 |
| Example 4 | Sample No. 3 | Sample No. 6 | 0 |
| Comparative example 1 | Sample No. 5 | Sample No. 5 | Galling occured at 23nd operation 10.4 |
| Comparative example 2 | Sample No. 8 | Sample No. 8 | Galling occured at 30th operation 6.9 |
| Comparative example 3 | Sample No. 10 | Sample No. 11 | Galling occured at 2nd operation 8.6 |
| Comparative example 4 | Sample No. 12 | Sample No. 12 | 0 |

As is apparent from Table 2, the sluice valves regarding this invention were excellent in galling resistance similarly to the sluice valve made of the cobalt-based alloy of Comparative example 4 which had heretofore been used for the valve seats, and it has also confirmed that they had good wear resistance.

Next, by the use of welding rods of Sample Nos. 13 to 15 shown in Table 3, pad welding was carried out on the seat ring.

TABLE 3

| Sample No. | Chemical composition (%) | | | | | | | |
|---|---|---|---|---|---|---|---|---|
| | C | B | Si | Cr | Mo | Nb | Fe | Ni |
| 13 | — | — | 0.17 | 26.3 | 10.7 | 11.0 | 3.2 | Remainder |
| 14 | — | — | 0.18 | 25.1 | 10.2 | 10.8 | 6.2 | Remainder |
| 15 | 0.45 | 2.36 | 2.65 | 10.5 | — | — | 3.0 | Remainder |

A test was accomplished in the same manner as described above, and the results are shown in Table 4.

TABLE 4

| | Combination of valve seats | | Flow rate of leaked water (cc/min) |
|---|---|---|---|
| | Body seat ring | Disc seat ring | |
| Example 5 | Sample No. 13 | Sample No. 1 | 0 |
| Example 6 | Sample No. 5 | Sample No. 14 | 0 |
| Example 7 | Sample No. 15 | Sample No. 5 | 0 |
| Comparative example 5 | Sample No. 15 | Sample No. 15 | Galling occured at 25th operation 8.5 |

As is apparent from Table 4, the sluice valves regarding this invention were excellent in galling resistance similarly to the sluice valve made of the cobalt-based alloy which had heretofore been used for the valve seats, and it was also confirmed that they had good wear resistance.

The aforementioned results indicate that in the valves regarding this invention, the Ni-based alloys and the Cr-Mn-Fe system and the Cr-Ni-Fe system Fe-based precipitation hardening type alloys are high in cavitation erosion resistance, and the combinations of both the alloys excellent in resistance to galling. Therefore, it is fair to say that the valves of this invention can have excellent wear resistance, cavitation erosion resistance and galling resistance, since emitting no cobalt, the valves of this invention are suitable for various plants such as chemical plants, particularly nuclear power plants.

We claim:

1. A liquid control valve having mating seating surfaces that are galling-resistant and cavitation erosion-resistant, which comprises a first valve seat ring comprising a disc or a body having a surface consisting essentially of a cobalt-free Fe-based precipitation hardening type alloy selected from the group consisting of Cr-Mn-Fe system and Cr-Ni-Fe system alloys, and a second valve seat ring having a surface different from said first valve seat ring and mating with said first valve seat ring to form a valve closure, said second valve seat ring surface consisting essentially of a cobalt-free Cr-Ni system Ni-based alloy having a hardness Hv of at least about 400.

2. A valve according to claim 1, wherein said Ni-based alloy consists essentially of 15 to 45% by weight of chromium, 3 to 15% by weight of niobium, 20% by weight or less of molybdenum and a residue of nickel.

3. A valve according to claim 2, wherein said Ni-based alloy consists essentially of 15 to 45% by weight of chromium, 3 to 15% by weight of niobium, 20% by weight or less of molybdenum, 20% by weight or less of iron and a residue of nickel.

4. A valve according to claim 1, wherein said Ni-based alloy has a hardness Hv of 450 or more.

5. A valve according to claim 1, wherein said Cr-Ni-Fe system Fe-based precipitation hardening type alloy further comprises aluminum.

6. A valve according to claim 5, wherein said Cr-Mn-Fe system Fe-based precipitation hardening type alloy consists essentially of 10 to 30% by weight of chromium, 10 to 30% by weight of manganese, 0.5 to 3.0% by weight of vanadium, 0.3% by weight or less or carbon, 0.2 to 1.0% by weight of nitrogen and a residue which is substantially iron, and wherein said Cr-Ni-Fe system Fe-based precipitation hardening type alloy consists essentially of 7 to 14% by weight of chromium, 6 to 10% by weight of nickel, 0.5 to 2.0% by weight of aluminum, 1.5 to 3% by weight of molybdenum, 0.1% by weight or less of carbon and a residue of iron.

7. A valve according to claim 6, wherein said Ni-based alloy consists essentially of 15 to 45% by weight of chromium, 3 to 15% by weight of niobium, 20% by weight or less of molybdenum and a residue of nickel.

8. A valve according to claim 7, wherein said valve is used in a chemical plant or nuclear power plant.

9. A valve according to claim 1, wherein said Cr-Ni system Ni-based alloy consists essentially of chromium, molybdenum, niobium and nickel, or consists essentially of chromium, silicon, boron and nickel.

10. A valve according to claim 1, comprising a sluice valve.

11. A valve according to claim 1, wherein said Fe-based precipitation hardening type alloy is a Cr-Ni-Fe system alloy consisting essentially of 7 to 14% by weight of chromium, 6 to 10% by weight of nickel, 0.5 to 2.0% by weight of aluminum, 1.5 to 3% by weight of molybdenum, 0.1% by weight or less of carbon and a residue of iron.

12. A valve according to claim 11, wherein said Ni-based alloy consists essentially of 15 to 45% by weight of chromium, 3 to 15% by weight of niobium, 20% by weight or less of molybdenum and a residue of nickel.

13. A valve according to claim 1, wherein said Fe-based precipitation hardening type alloy is a Cr-Mn-Fe system alloy consisting essentially of 10 to 30% by weight of chromium, 10 to 30% by weight of manganese, 0.5 to 3.0% by weight of vanadium, 0.3% by weight or less of carbon, 0.2 to 1.0% by weight of nitrogen and a residue which is substantially iron.

* * * * *